(12) United States Patent
Czapp et al.

(10) Patent No.: US 11,225,380 B2
(45) Date of Patent: Jan. 18, 2022

(54) CONVEYOR SYSTEM FOR THE TRANSPORT OF PACKAGED FOOD PRODUCTS

(71) Applicant: Franke Technology and Trademark Ltd, Hergiswil (CH)

(72) Inventors: Ireneusz Czapp, Reda (PL); Mario Kiel, Schwalmtal (DE); Tomasz Robaszkiewicz, Rumia (PL)

(73) Assignee: Franke Technology and Trademark Ltd, Hergiswil (CH)

( * ) Notice: Subject to any disclaimer, the term of this patent is extended or adjusted under 35 U.S.C. 154(b) by 0 days.

(21) Appl. No.: 16/971,083

(22) PCT Filed: Feb. 27, 2019

(86) PCT No.: PCT/EP2019/054840
§ 371 (c)(1),
(2) Date: Aug. 19, 2020

(87) PCT Pub. No.: WO2019/166480
PCT Pub. Date: Sep. 6, 2019

(65) Prior Publication Data
US 2021/0094761 A1   Apr. 1, 2021

(30) Foreign Application Priority Data

Feb. 28, 2018 (EP) .................................... 18159226

(51) Int. Cl.
*B65G 17/48* (2006.01)
*B65G 17/12* (2006.01)
*B65G 47/57* (2006.01)

(52) U.S. Cl.
CPC ......... *B65G 17/485* (2013.01); *B65G 17/123* (2013.01); *B65G 47/57* (2013.01); *B65G 2201/0202* (2013.01)

(58) Field of Classification Search
CPC .... B65G 17/485; B65G 17/123; B65G 17/18; B65G 47/57; B61B 13/04
See application file for complete search history.

(56) References Cited

U.S. PATENT DOCUMENTS 3,922,970 A * 12/1975 Glastra ................. B61L 23/005
                                                        104/91
4,015,537 A *  4/1977 Graef ..................... B61B 13/00
                                                        104/91

(Continued)

FOREIGN PATENT DOCUMENTS

| WO | 8100393 | 2/1981 |
|----|---------|--------|
| WO | 2010101463 | 9/2010 |
| WO | 2016030275 | 3/2016 |

*Primary Examiner* — William R Harp
(74) *Attorney, Agent, or Firm* — Volpe Koenig

(57) ABSTRACT

A conveyor system that utilizes a curved, closed-loop pathway defined by a profiled track and a plurality of wheel cars movably contained within and guided by the profiled track. The wheel cars have an attachment side facing towards an open side of the profiled track, and the track is arranged such that its open side faces into a substantially horizontal direction and such that the attachment side of the cars is oriented substantially vertically in any position along the pathway. One or more carriers, each having a carrier rack adapted to support a food product to be transported, are mounted to the attachment side of a respective one of the wheel cars. The carriers can pivot about an axis perpendicular to the attachment side of the corresponding car so as to maintain the carrier rack in a horizontal position as the carrier travels along the pathway.

10 Claims, 5 Drawing Sheets

(56) References Cited

U.S. PATENT DOCUMENTS

| | | | | |
|---|---|---|---|---|
| 4,411,336 A | * | 10/1983 | Anders | G07D 11/10 |
| | | | | 186/37 |
| 5,361,891 A | * | 11/1994 | Greene | B65G 19/02 |
| | | | | 186/37 |
| 5,372,072 A | * | 12/1994 | Hamy | B61B 13/04 |
| | | | | 104/119 |
| 6,533,106 B1 | | 3/2003 | Lykkegaard | |
| 7,708,135 B2 | | 5/2010 | Ellerth et al. | |
| 2005/0061622 A1 | | 3/2005 | Martin | |

* cited by examiner

CONVEYOR SYSTEM FOR THE TRANSPORT OF PACKAGED FOOD PRODUCTS

FIELD OF THE INVENTION

The present invention relates to the field of conveyor systems and, more particularly, to a closed-loop food conveyor system for use in chain restaurants, bars, cafeterias, or the like.

BACKGROUND

Applicant has developed and markets an overhead conveyor system which is based on a continuous aluminum track made up into a closed loop that contains an endless "train" of small wheel cars connected together. The track is normally suspended from the ceiling or wall and can be made to snake through a building from a loading point to an unloading point and back again. Food products to be transported need to be wrapped in bags, which will then be pushed into special product clips carried by some of the wheel cars. To release a bag from a clip, a lever arm is activated at the unloading point which releases the clip and the food is placed into a holding tray.

Another food transport system for the vertical transport of packaged food items from one floor of a restaurant to another floor is described in U.S. Pat. No. 7,708,135. The food transport system includes a conveyor that transports food-item supporting carriers along a closed-loop pathway defined by a belt or chain, to which the carriers are pivotably connected. Although the transport of food items placed on supporting carriers is convenient, the belt or chain based conveyor system is much less flexible in terms of space utilization and winding transport pathways.

SUMMARY

It is therefore an object of the present invention to provide a conveyor system for the transport of packaged food items in restaurants, which on the one hand allows a flexible design of layouts, which can be configured to move food products in any direction, horizontally or vertically, which allows the route to move through even tight spaces and is efficient in the utilization of floor space, but which on the other hand provides a convenient transport without the need of paper bags that hang with a clip from an overhead transporter. The inventors have thus thought of a way to equip a track-based conveyor system as the one described above with supporting carriers on which food items to be transported can be placed instead of hanging with a bag from a clip.

These and other objects are achieved by a conveyor system having one or more of the features described herein. Advantageous embodiments are described below and in the claims.

The conveyor system in accordance with the invention utilizes a curved, preferably closed-loop pathway defined by a profiled track and a plurality of wheel cars movably contained within and guided by the profiled track. The wheel cars have an attachment side facing towards an open side of the profiled track, and the track is arranged such that its open side faces into a substantially horizontal direction and such that the attachment side of said cars is oriented substantially vertically in any position along the pathway. The track forms a kind of longitudinal cage or cage rail for the wheel cars with an open side facing in horizontal direction. One or more carriers, each having a carrier rack adapted to support a food product to be transported are mounted to the attachment side of a respective one of the wheel cars. The carriers can pivot about an axis perpendicular to the attachment side of the corresponding car so as to maintain the carrier rack in a horizontal position as the carrier travels along the pathway. The track has at least one substantially horizontal section where a flat support rail is arranged below the track along this substantially horizontal section and a slider or roller is connected to the carriers, which supports the respective carrier against the support rail.

The inventors have taken a track-based conveyor system such as their existing overhead transporter and turned the track by 90 degrees so that the open side of the track faces in horizontal direction rather than downside and the attachment side of the wheel cars becomes vertical. A carrier suspends pivotably from this attachment side, so that it automatically stays in a horizontal position, regardless of the direction of the track. Through this, the system can flexibly move around corners, between floors, around obstructions, over drive though lanes and through walls, while the carrier rack on which a food product can be placed stays horizontal all time.

A particular feature of the present invention is that it enables the horizontal transport of carriers. The carrier is shaped such that it can pass through horizontal inner curves, i.e. does not interfere with the neighboring wheel cars when passing through an inwardly curved section.

It has been found that along horizontal sections of the conveyor system the lever forces which the loaded carrier exert onto the track and wheel cars becomes quite high. This can lead to increased wear and tear of the wheels and bearings. In order to compensate for these lever forces, according to the invention, a flat support rail is arranged below the track along substantially horizontal sections and a slider or roller is associated with/connected to each of the carriers and corresponding wheel cars, which supports the carrier against the support rail and absorbs any shear forces the horizontal lever arm of the carrier will exert onto the track and wheel car. The use of support rails thus increases lifetime and increases stability of the carrier.

According to a preferred aspect, a base plate with a front side and a back side is installed between the carrier and the corresponding wheel car. The base plate extends laterally beyond the track and carries at its front side a hanging pivot, such as a pivot pin, from which the carrier is suspended. At its back side the base plate carries the slider or roller. The definition of the base plate extending laterally beyond the track is to be understood such that it extends in a direction perpendicular to the longitudinal orientation of the track. In other words, when the track is oriented in a horizontal direction, the base plate extends in vertical direction below and/or above the track.

In a preferred embodiment, the base plate carries at its front side at least one lateral bumper against which the carrier rests when travelling along a horizontal section of the track. The bumper provides the carrier stability while it has an additional function of braking a longitudinal hesitation (anti swinging) of the carriers during changing direction when passing through vertical curves at higher speed. The bumper thus suppresses swinging and dampens movements of the carrier, which allows a faster operation of the conveyor system and higher acceleration of the wheel cars, without running the risk that food items carried by on carrier rack may fall off.

In a further preferred embodiment, the base plate has lateral extensions that extend on both sides beyond the track and carry at its back side on both of its lateral extensions a respective slider or roller. Through this, when the track contains a U-turn, particularly in case of a closed-loop pathway, the carrier has always one of the rollers or sliders that support against the flat rail below, irrespective of whether it travels on a first branch to one side or turns around to travel on a parallel second branch in opposite direction.

In this case, it is advantageous when the base plate carries at its front side on both of its lateral extensions a respective lateral bumper such that when travelling in horizontal direction, the carrier rests against the lower of the two lateral bumpers, and the two bumpers will switch roles when the carrier turns in the opposite direction.

The track may further comprise one or more curved sections. In this case, further curved flat support rails can be arranged below or around such curved sections against which the slider or roller will support the carrier when travelling along the curved sections. This improvement is owed to the finding that the carrier not only along horizontal sections of the track exerts shear forces onto its wheel car, but due to centrifugal forces and radial acceleration, to name but a few, also when the track follows a curve. In this case, the carrier is supported by its roller or slider along the curved flat support rail.

The flat support rails are preferably attached in constant distance below the track, which can be achieved with suitable distance pieces acting as holders for the support rail with respect to the track above.

The wheel cars can be connected together by hinged joints to form a train of cars. This is particularly useful for a closed loop track, which can be completely filled with and endless train of joint wheel cars. In this case, according to a preferred aspect, neighboring bumpers can be installed on cars in directly adjacent positions to a carrier such that when travelling in vertical direction, the carrier rests against the lower of its neighboring bumpers, so as to avoid swinging movements when traveling in vertical direction, too.

The bumpers can preferably be arranged around the carrier in the form of a cross, so that irrespective in which direction the track will bend and the carrier will thus move, the carrier is always supported by one of its four surrounding bumpers.

According to yet another aspect, the carrier rack is pivotably mounted with respect to the corresponding car to allow the carrier rack to pivot upwardly about a horizontal axis so as to allow the carrier support members to pivot towards a generally vertical orientation. This allows the carrier rack to pivot upwardly when its downward path is obstructed.

BRIEF DESCRIPTION OF THE DRAWINGS

Further advantages and characteristics of the invention will become apparent by the below description of embodiments making reference to the accompanying drawings, in which.

DETAILED DESCRIPTION

Figure 1:
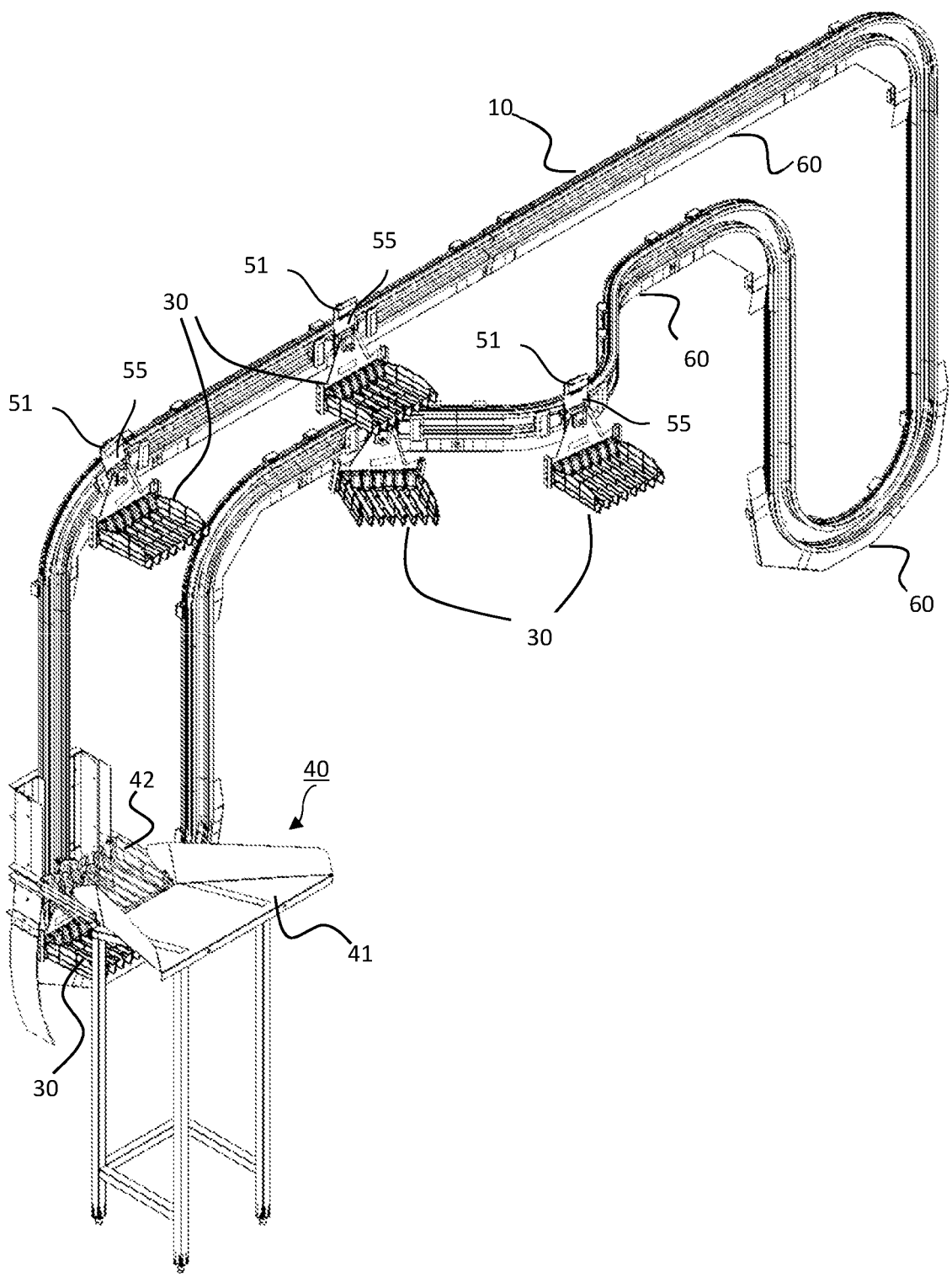
FIG. 1 shows in isometric view of a conveyor system with a closed-loop profiled track guiding an endless train of wheel cars.

FIG. 1 shows an exemplary setup of a conveyor system for the transport of packaged food products. The system uses a profiled track 10 made from lightweight aluminum track sections connected together to form a closed loop. Although this is the preferred configuration, the invention is in principle not limited to a closed loop configuration. The track can be made to snake through the building from a loading point to an unloading point and back again. The track can run horizontally in a straight line and around corners; in a straight line in a vertical direction and, optionally, in a straight line on a 45-degree incline, too.

It should be understood that the setup in FIG. 1 is just a simplified example to show the function of the system The actual design of the route that the track takes is determined by the location and orientation of the load and unload points, the position and size of kitchen equipment, and layout of the building itself. Typically, the track will run from a load point located in the food preparation area, the track route itself, and an unload point located by a drive-thru window or in a kiosk. It has small radius for horizontal and vertical bends to allow the route to move through tight spaces. The actual track layout is made up of standard horizontal and vertical corners and straight sections of track that can be cut to length. The significant advantage of the track-based conveyor system is that unlike a normal conveyor belt it is not limited to a straight line between two points and it does not take up valuable floor space.

Figure 2:
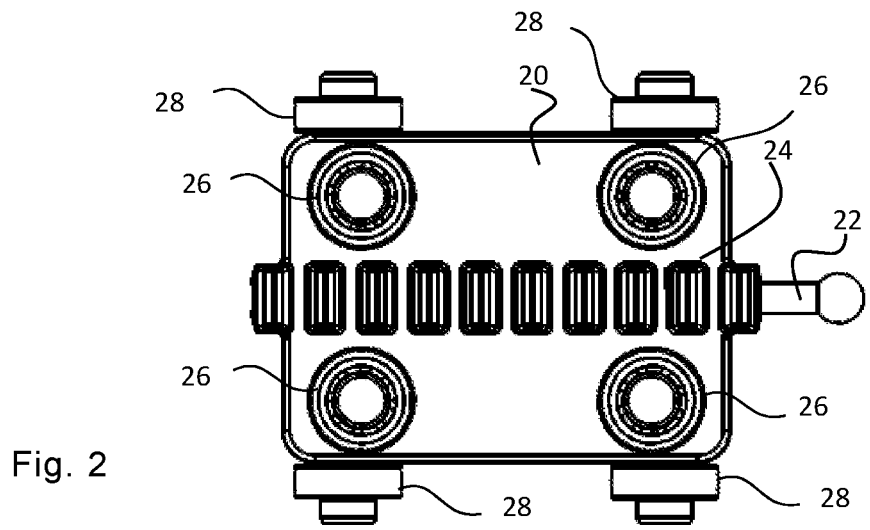
FIG. 2 shows a view from the bottom side on a wheel car used in the system of FIG. 1.
Figure 3:
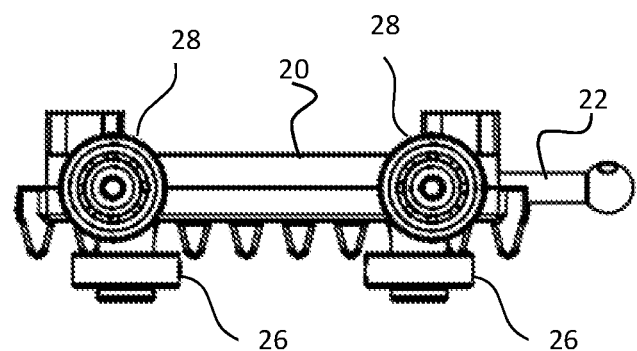
FIG. 3 shows a side view of the wheel car of FIG. 2.

The profiled track 10 is formed as a kind of longitudinal cage or cage rail for a number of small wheel cars 20 as the one shown in FIGS. 2 and 3, which are contained inside and guided by the profiled track 10. The wheel cars 20 are connected together by hinged joints 22 to form a continuous train of cars. The train of cars 20 in the track system is pulled around by an electric drive system that uses an motor with a direct drive sprocket that engages through a backside opening in the track with teeth 24 incorporated into the bottom of the cars 20.

Figure 4:
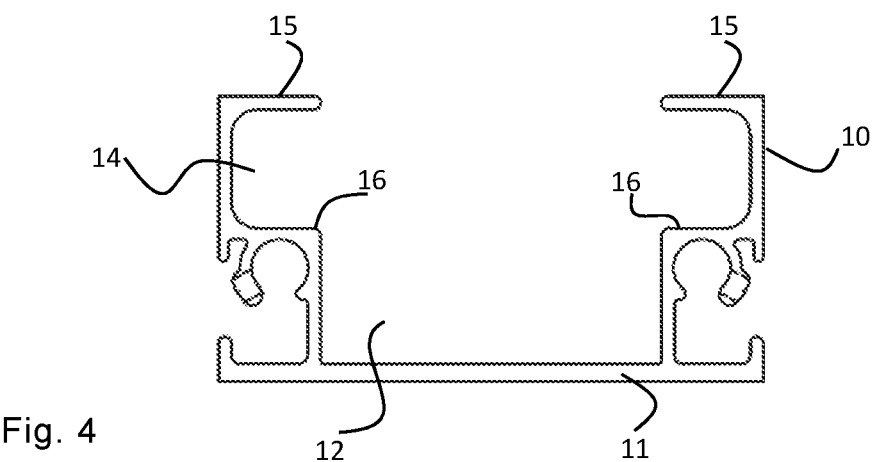
FIG. 4 shows a cross section of the profiled track used in the system of FIG. 1.

The profile of the track 10 can be viewed in more detail in a cross section shown in FIG. 4. The track 10 has a closed backside wall 11, which serves for attachment of the track to a wall or other building structure. Adjacent to the backside wall 11, the track as a narrower portion 12 confined by side walls, which extends towards an open front side 16 into a wider portion 14. The wider portion 14 is confined towards the open front side by inwardly facing shoulders 15.

The wheel cars 20 have at their backside a row of teeth 24 to which the drive sprocket may engage. Four small wheels 26 in the four corners at the backside of the car 20, which have their axis perpendicular to the backside wall 11, roll along the side walls of the track 10 in the narrower section 12 and support the wheel car 10 in lateral direction. Four lateral wheels 28 at both sides of the wheel car 10 are positioned in the wider section 14 of the track 10 to roll along the shoulders 15 and the step 16 formed at the junction between the narrower and the wider sections 12, 14 and support the wheel car 10 in the direction perpendicular to the backside wall 11.

Cars 10 and wheels 24, 26 can be made from a high performance plastic with built in lubricating properties, such as PTFE for instance, which means the system requires no further lubrication during operation or for maintenance.

Figure 5:
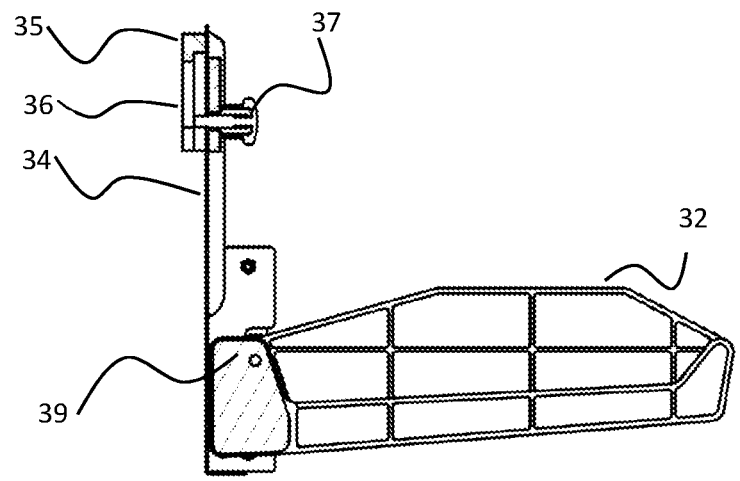
FIG. 5 shows a side view of a carrier used in the system of FIG. 1 to transport food items.
Figure 6:
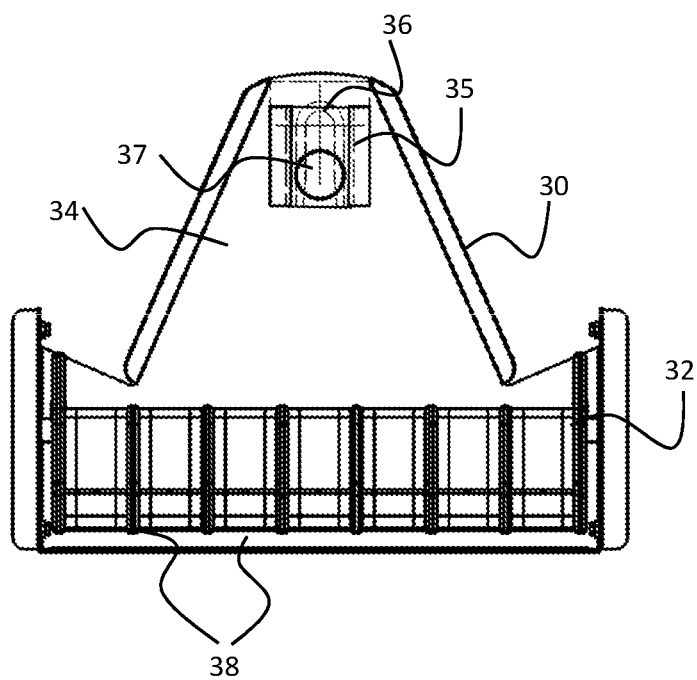
FIG. 6 shows a front view of the carrier of FIG. 5.

The front side of the wheel cars 10 may serve for the attachment of a carrier 30 with a carrier rack or basket 32 on which food products to be transported can be placed. The carrier used in the embodiment is shown in FIGS. 5 and 6. It has a back panel 34 of substantially triangular shape. At the back of the back panel 34 is an eyelet 35 with a slot 36 that is open to the bottom side. The eyelet 35 serves to hang the carrier 30 to a pivot pin attached to one of the wheel cars 20, so that the carrier can pivot or swing around the pivot pin and thus maintains a horizontal position when travelling along the track, irrespective of the direction of the track. An indexing plunger 37 at the front side serves to lock the eyelet to the pivot pin so that it cannot fall off.

The carrier rack or basket 32 contains a number of fingers 38, which extend substantially vertically from the back panel 34 and bend slightly upwards towards their free end. The carrier basket is connected to the back panel 34 with a hinge connection 39 so that the carrier rack 32 can pivot upwardly about a horizontal axis. This will allow the carrier rack to pivot upwardly into a substantially vertical position when its downward path is obstructed.

On the left side of the conveyor system in FIG. 1 is a food loading point 40, which has a funnel-shaped slide 41, which ends on a similar comb structure 42 with fingers extending opposite the fingers 38 of the carrier racks 32. A ready and wrapped food item can be placed on the slide 41 and will slip down onto the comb structure 42. A carrier, which comes from below, will pick up the item in that the fingers 38 of the carrier rack 32 comb through the corresponding fingers of the comb structure 42.

Figure 7:
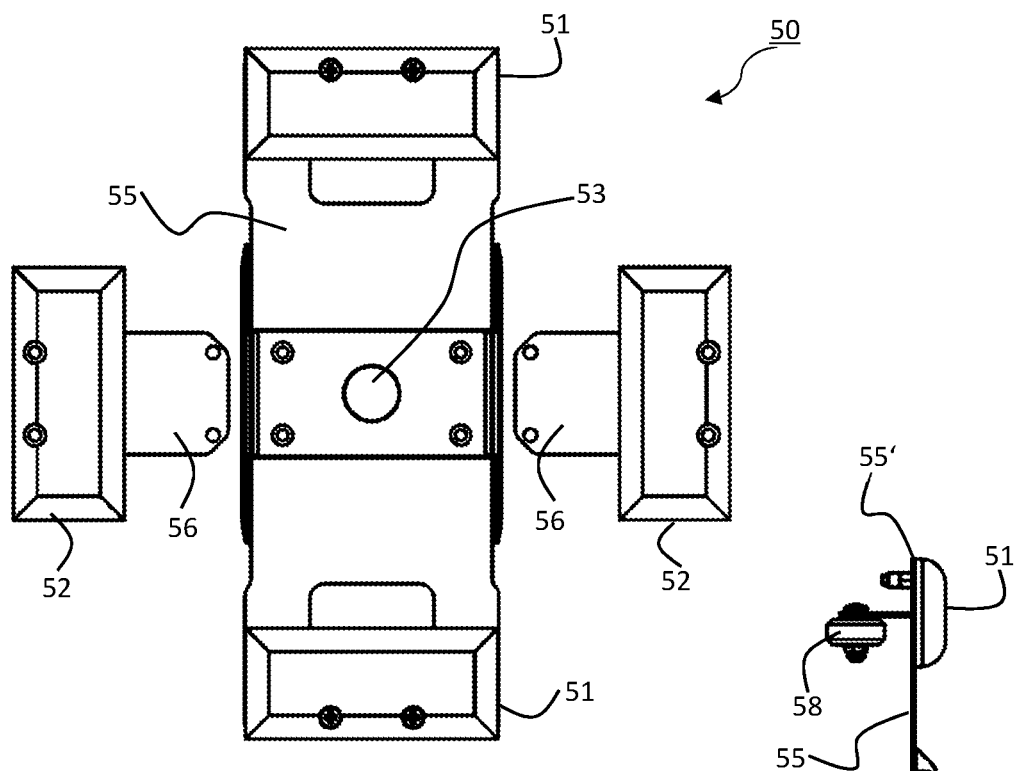
FIG. 7 shows a front view of the base plate and bumper cross installed between the carriers and corresponding wheel cars.
Figure 8:
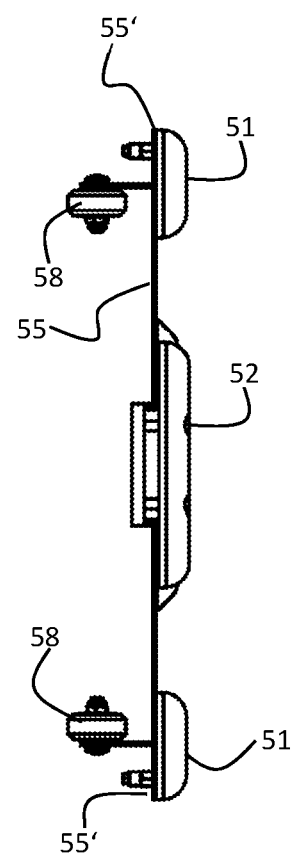
FIG. 8 shows a side view of the base plate and bumper cross of FIG. 7.
Figure 9:
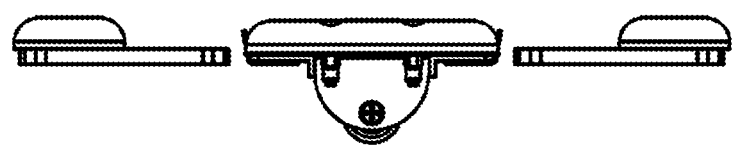
FIG. 9 shows a top view of the base plate and bumper cross of FIG. 7.

For the attachment of the carrier basket 30 to a corresponding wheel car 20 serves a base plate 55 and bumper cross 50 which can be viewed in more detail in FIGS. 7 to 9. The bumper cross 50 has four bumpers 51, 52 arranged around the pivot pin 53 in all four directions, vertically and horizontally. The carrier 30, which suspends pivotably from the pivot pin 53, rests against the lowest of the bumpers 51, 52. As the corresponding wheel car 20 travels along the curved track, it will turn by 90 (or 180) degrees when the track makes a turn and thus the bumpers will switch their roles so that another one of the bumpers will become the lowest.

The bumpers 51, 52 are made from elastic material such as rubber, silicone or the like and support and stabilize the carrier rack 32 hanging from the pivot pin. Friction between the bumper and the carrier rack 32 will dampen a swinging movement the carrier might fulfill due to acceleration as the conveyor system starts or stops or radial acceleration as the carrier moves through a curve.

The bumpers 51 are attached to a base plate 55 that extends laterally on both sides of the track 10. Bumpers 52 are attached via separate mounting plates to adjacent wheel cars 20. At the two lateral extensions 55' of the base plate 55, which extend beyond the track 10, there are small rollers 58 installed at the back side. The purpose of these additional rollers is to support the carrier along horizontal sections of the track or in curves. In order to do so, the conveyor system has flat support rails 60 installed below the track 10 along (at least) its horizontal sections. The lower of these rollers 58 will be in contact with the flat support rail 60 underneath and, as the carrier moves, will roll along the support rail 60. The lower of the rollers 58 via the base plate 55 and the lower of the bumpers 51 will thus absorb any lever forces which the horizontal lever arm of the carrier, i.e. the fingers 38 of the carrier rack 32 with the load carried thereon, exerts onto the track 10 and wheel car 20.

Figure 10:
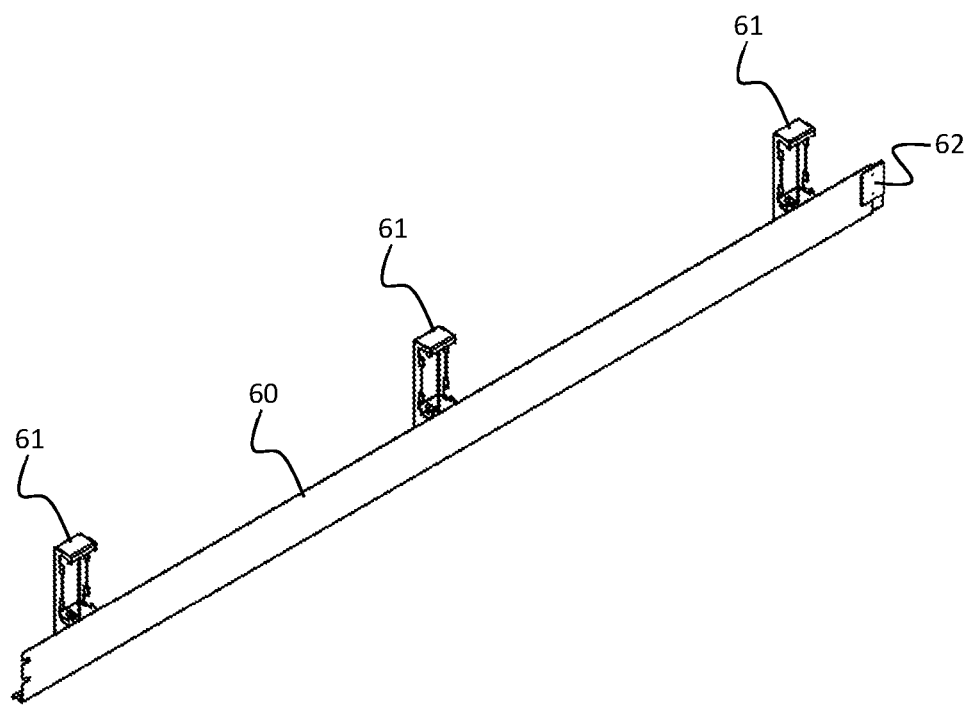
FIG. 10 shows a flat support rail for installation beneath horizontals sections of the track system of FIG. 1.
Figure 11:
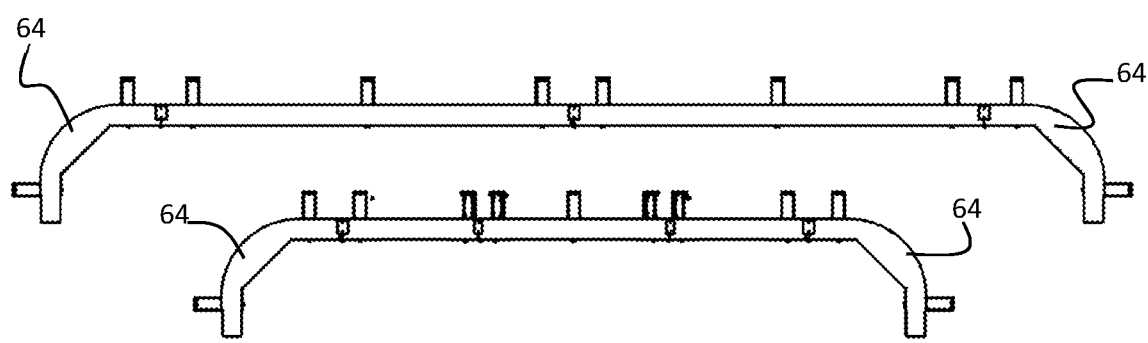
FIG. 11 shows the set of flat support rails and curved flat support rails installed in the system of FIG. 1.
Figure 11:
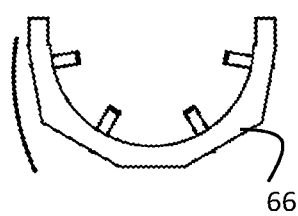
Figure 11:
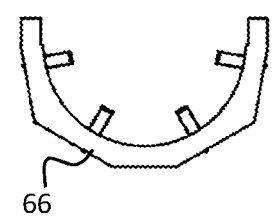

The flat support rails 60 are shown in more detail in FIGS. 10 and 11. Holders 61, which act as distance pieces to hold the support rail 60 in constant distance from the track 10, are used to attach the support rail 60 to the track 10, where the latter runs in horizontal direction. Additional inner curved support rails 64 at the inside of a curved section or outer curved support rails 66 running around upwards twisted sections of the track 10 complement the support rails 60. The support rails 60 are provided in sections of different lengths or can be cut to length and can be joint with joining plates 62.

The conveyor system may be designed as an "on-demand" system. In other words, the system only works when there is product that needs to be carried from the load point to the offload point. To operate the system, the crew person simply places a wrapped food product onto the slide 41 of the loading point 40. The system is started by pressing the "Load" button, and the carrier with the food product is moved rapidly along the track at up to 8 ft per second. When the carrier arrives at the offload point, the product will be taken from the carrier. The system can also be equipped with a control system with logic for automatically stopping the system after the food item has been unloaded. A variable speed control system also provides smooth acceleration and deceleration of the system to avoid jerky movements.

The invention claimed is:

1. A conveyor system for the transport of packaged food products, the conveyor system comprising:
   a curved pathway defined by a profiled track (10);
   a plurality of wheel cars (20) movably contained within and guided by said profiled track (10), said wheel cars (20) having an attachment side facing towards an open side of said profiled track (10);
   said track (10) being arranged such that said attachment side of said cars (20) is oriented substantially vertically as the cars travel along the pathway;
   at least one carrier (30) with a carrier rack (32) adapted to support a food product to be transported, said carrier (30) being pivotably mounted to the attachment side of one of the wheel cars (20) to maintain the carrier rack (32) in a horizontal position as the carrier travels along the pathway;
   said track comprises at least one substantially horizontal section;
   a flat rail (60) is arranged below said track (10) along said substantially horizontal section; and
   at least one slider or roller (58) is connected to said carrier (30), which is pivotably mounted on the corresponding wheel car (20), and the at least one slider or roller (58) supports said carrier (30) against said flat rail (60).

2. The conveyor system according to claim 1, further comprising a base plate (55) having a front side and a back side installed between the carrier (30) and the corresponding wheel car (20), said base plate (55) extending laterally beyond said track (10) in a direction perpendicular to a longitudinal orientation of the track (10); a hanging pivot (53) arranged at said front side of the base plate from which said carrier (30) is suspended; and the base plate (55) having a back side which carries said at least one slider or roller (58).

3. The conveyor system according to claim 2, wherein said front side of the base plate (55) carries at least one lateral bumper (51) against which said carrier (30) rests when travelling along said substantially horizontal section of said track (10) to suppress swinging movements of said carrier (30).

4. The conveyor system according to claim 3, wherein said base plate (55) has lateral extensions that extend beyond said track (10) on an upper side and a lower side of said track (10) and respective ones of the sliders or rollers (58) are located on each of the lateral extensions.

5. The conveyor system according to claim 4, wherein said front side of the base plate (55) carries on each of the lateral extensions a respective lateral bumper (51) such that when travelling in the horizontal direction, said carrier (30) rests against a lower of the lateral bumpers (51).

6. The conveyor system according to claim 5, wherein the wheel cars (20) are connected together by hinged joints (22) to form a train of cars and neighboring bumpers (52) are installed on cars in directly adjacent positions to said carrier (30) such that when travelling in a vertical direction, said carrier rests against a lower of said neighboring bumpers (52), and said bumpers (51, 52) are arranged around said carrier (30) in a cross shape.

7. The conveyor system according to claim 3, wherein the wheel cars (20) are connected together by hinged joints (22) to form a train of cars and neighboring bumpers (52) are installed on cars in directly adjacent positions to said carrier (30) such that when travelling in a vertical direction, said carrier rests against a lower of said neighboring bumpers (52).

8. The conveyor system according to claim 1, wherein the track (10) comprises one or more curved sections and curved flat rails (64, 66) are arranged below or around said curved sections against which said slider or roller (58) supports said carrier (30) when travelling along said curved sections.

9. The conveyor system according to claim 8, wherein said flat rails (60) or curved flat rails (64, 66), respectively, are attached at a constant distance from said track (10) via distance pieces (61).

10. The conveyor system according to claim 1, wherein the carrier rack (32) is pivotably mounted with respect to the corresponding wheel car (20) to allow the carrier rack (32) to pivot upwardly about a horizontal axis so as to allow carrier support members (38) of the carrier rack to pivot towards a generally vertical orientation.

* * * * *